United States Patent [19]

Maeda et al.

[11] 3,845,297

[45] Oct. 29, 1974

[54] LIGHT RECEIVER

[75] Inventors: Itsuji Maeda, Akishima; Yahiko Tamaki, Kodaira, both of Japan

[73] Assignees: Hitachi Electronics Co., Ltd.; Nisshin Steel Co., Ltd., both of Tokyo, Japan

[22] Filed: Jan. 19, 1973

[21] Appl. No.: 325,093

[30] Foreign Application Priority Data
Jan. 28, 1972   Japan................................. 47-9867

[52] U.S. Cl.................................. 250/216, 250/227
[51] Int. Cl......... G02b 5/14, H01j 5/16, H01j 39/12
[58] Field of Search............................ 250/216, 227

[56] References Cited
UNITED STATES PATENTS

| | | | |
|---|---|---|---|
| 1,981,999 | 11/1934 | French............................ | 250/227 X |
| 2,187,908 | 1/1940 | McCreary....................... | 250/227 X |
| 3,153,172 | 10/1964 | Ku Sun Ling................... | 250/227 X |

*Primary Examiner*—James W. Lawrence
*Assistant Examiner*—T. N. Grigsby
*Attorney, Agent, or Firm*—Craig & Antonelli

[57] ABSTRACT

A light receiver for use with an optical surface flaw detector comprising a diffusion film, light collector and photo-electric element.

5 Claims, 4 Drawing Figures

FIG. 1
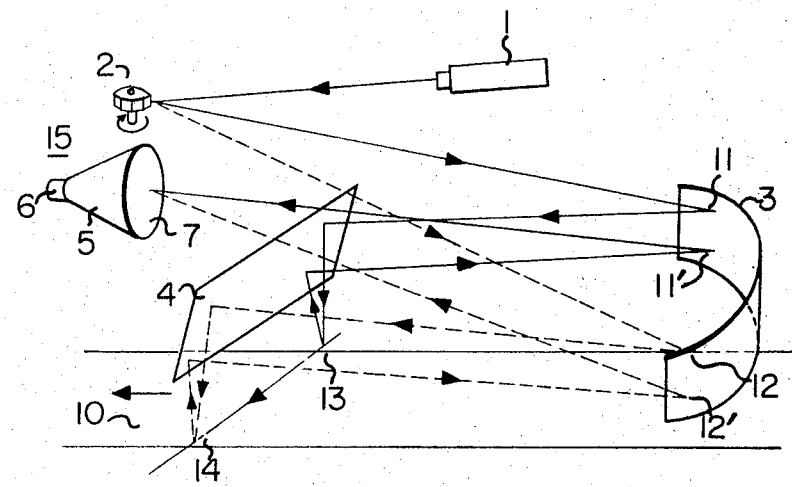
FIG. 2a  FIG. 2b  FIG. 2c
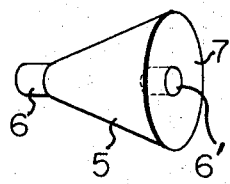 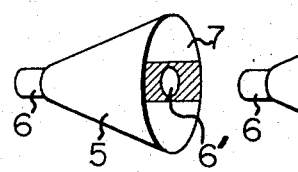 

LIGHT RECEIVER

BACKGROUND OF THE INVENTION

1. Field of the Invention

This invention relates to means for receiving light for use with a flaw detector which detects flaws on the surface of metal sheets or the like by optical flying spot scanning.

2. Description of the Prior Art

If a device for detecting defects on the surface of a running plate by scanning it with light spots at a transverse direction to the direction of the feed of the running plate and by measuring the variations in light reflected from the surface of the object is to be used to detect a change in texture, scab and other flaws, it is effective to employ a light receiver with such a large area of light receiving surface as to receive most of the scattered light. For this purpose, the conventional inspecting means uses an arrangement of a multiplicity of photo-electric elements in order to receive most of the reflecting light. Such a conventional method, however, has the disadvantages of high cost and unstable sensitivity of the photo-electric elements used.

SUMMARY OF THE INVENTION

An object of the present invention is to provide a light receiver which is capable of detecting with almost the same accuracy as the inspection with a naked eye a change in texture and other flaws hard to detect with the conventional devices. The device according to the present invention is capable of receiving almost all the scattered light from the running object to be inspected.

BRIEF DESCRIPTION OF THE DRAWINGS

FIG. 1 is a diagram showing an example of the flying spot type surface flaw detector with a light collector according to the present invention.

FIGS. 2a, 2b and 2c are diagrams showing embodiments of the present invention.

DESCRIPTION OF THE PREFERRED EMBODIMENTS

Referring to FIG. 1 showing an example of the inspecting device employing the light receiver according to the present invention, reference numeral 1 designates a laser oscillator, 2 a polyhedral rotary mirror, 3 a parabolic concave mirror, 4 a plane mirror, 5 a cylindrical or pyramidal light collector, 6 a photoelectric element, 7 a diffusion film, and 10 an object running in the direction of the arrow, 15 showing a light receiver made up of the light collector 5, the photoelectric element 6 and the diffusion film 7.

The operation of the embodiment mentioned above will be now explained.

Laser beam produced from the laser oscillator 1 is reflected on the polyhedral rotary mirror 2 and applied to the parabolic concave mirror 3.

With the rotation of the polyhedral rotary mirror 2, a laser beam scans the surface of the parabolic concave mirror 3 from point 11 toward point 12 and, after being reflected from the parabolic concave mirror 3, is reflected again on the plane mirror 4 so that the object plate 10 is scanned from point 13 to point 14. The beam of light reflected on the object plate 10 is again reflected on the plane mirror 4, followed by the reflection on the parabolic mirror 3 between the point 11' and point 12', with the result that the beam thus reflected is detected by the photoelectric element 6 of the light receiver 15 placed at the focal point of the parabolic concave mirror 3. At the same time, the availability of a great area of the light receiving surface of the diffusion film of the light receiver 15 permits most of the scattered light from the object plate 10 to be received, thereby making it possible to detect changes in texture and other flaws which have been hard to detect with the conventional device except with a naked eye.

Embodiments of the invention are shown in FIG. 2a through 2c. In the embodiment illustrated in FIG. 2a, there is provided at the center of the diffusion film 7 of the light receiver a photoelectric element 6' for receiving only regularly reflected light, whereas irregularly reflected light is received by the photoelectric element 6. This arrangement permits regularly and irregularly reflected lights to be detected independently of each other for improved detecting ability of the light receiver. The embodiment of FIG. 2b is so constructed that a part of the diffusion film 7 of the light receiver in the shape of band is made opaque to light. This light receiver contributes to an improved light receiving ability in a hair line finishing which may cause the light to be reflected in the shape of stripes. The embodiment of FIG. 2c is provided with a photoelectric element 6'' for receiving a small amount of light regularly reflected on the outer surface of the diffusion film 7 of the receiver. This embodiment which is almost as effective as the embodiment of FIG. 2 a is different from the embodiment of FIG. 2a in that in the embodiment under consideration the photoelectric element 6 receives a mixture of regularly reflected light and scattered light from the diffusion film 7, while a small amount of light regularly reflected on the outer surface of the diffusion film 7 is received by the photoelectric element 6''. As a result, the detecting efficiency is different for both the embodiments of FIGS. 2a and 2c depending on the type of the objects to be inspected.

Instead of the cylindrical light collector used in the embodiments shown in the drawings, a light collector in the form of a square or hexagonal pyramid may be employed without departing from the spirit of the invention.

As will be seen from the above explanation, the light receiver according to the present invention, if used with a surface inspecting device, permits the detection of a change in texture and other flaws which have been hard to detect with the conventional devices. Further, by using the light receivers shown in FIGS. 2a through 2c, it is possible to detect all kinds of flaws with almost the same accuracy as the inspection with a naked eye.

We claim:

1. A light receiver comprising a cone-shaped or polyhedral light collector with an inner reflection surface, a diffusion film covered on the base of said light collector, a first photoelectric element provided on the top of said light collector for receiving light from inside of said light collector, and a second photoelectric element provided at the center of said diffusion film for receiving light from outside of said light collector.

2. A light receiver comprising a cone-shaped or polyhedral light collector with an inner reflection surface, a diffusion film covered on the base of said light collector and which has a part thereof opaque to light, a first photoelectric element provided on the top of said light collector for receiving light from inside of said light collector, and a second photoelectric element provided at the center of said diffusion film for receiving light from outside of said light collector.

3. A light receiver comprising a hollow light collector in the shape of a cone having an inner reflection surface, a diffusion film covering the base of said light collector, a first photoelectric element positioned at the apex of said light collector to receive incident light through said diffusion film, and a second photoelectric element positioned to only receive light directly from said diffusion film.

4. A light receiver as defined in claim 3 wherein said second photo-electric element is positioned at the center of said diffusion film for receiving light from outside of said light collector.

5. A light receiver as defined in claim 3 wherein said second photo-sensitive element is positioned outside said light collector for receiving light regularly reflected on said diffusion film.

* * * * *